United States Patent [19]
Makioka et al.

[11] Patent Number: 5,238,658
[45] Date of Patent: Aug. 24, 1993

[54] EXHAUST GAS TREATMENT APPARATUS

[75] Inventors: Takayuki Makioka, Tsuchiura; Kohei Fujimura, Kawasaki, both of Japan

[73] Assignee: Teisan Kabushiki Kaisha, Tokyo, Japan

[21] Appl. No.: 830,918

[22] Filed: Feb. 4, 1992

[30] Foreign Application Priority Data

Feb. 5, 1991 [JP] Japan .................. 3-35277

[51] Int. Cl.$^5$ .............................. B01D 53/02
[52] U.S. Cl. ........................ 95/90; 422/177; 95/116; 96/131; 96/133
[58] Field of Search ......... 422/177; 55/68, 180

[56] References Cited

U.S. PATENT DOCUMENTS 4,840,647 6/1989 Hay ..................... 55/68 X

Primary Examiner—Robert J. Warden
Assistant Examiner—E. Leigh Dawson
Attorney, Agent, or Firm—Oblon, Spivak, McClelland, Maier & Neustadt

[57] ABSTRACT

An exhaust gas treatment apparatus, which comprises first and second gas adsorbing columns each having inlet and outlet pipes; and switch-over pipes connecting the first and second gas adsorbing columns being alternatively arranged in parallel to or in series with each other, the switch-over pipes having valves arranged therein.

5 Claims, 3 Drawing Sheets

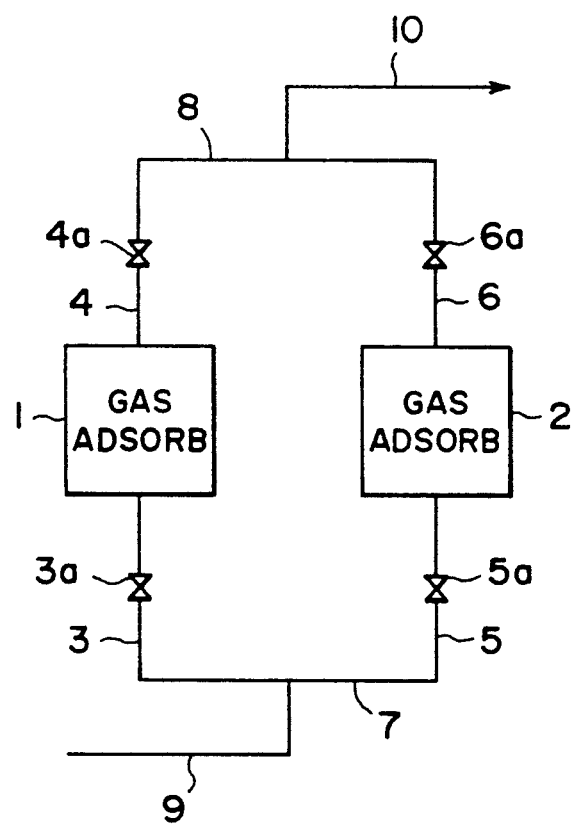

EXHAUST GAS TREATMENT APPARATUS

BACKGROUND OF THE INVENTION

1. Field of the Invention

The present invention relates to an exhaust gas treatment apparatus, particularly to an exhaust gas treatment apparatus in which untreated gas is prevented from being discharged when a gas adsorbing column is exchanged.

2. Description of the Background

FIG. 5 of the present specification shows a conventional exhaust gas treatment apparatus using two gas adsorbing columns, wherein the reference numerals 1 and 2 each are a gas adsorbing column with a gas adsorbent contained in its inside, 3 to 6 each are inlet pipes and outlet pipes of these gas adsorbing columns 1 and 2, 7 is an inlet pipe connecting the inlet pipes 3 and 5 of said gas adsorbing columns 1 and 2, 8 is an outlet pipe connecting the outlet pipes 4 and 5 of said gas adsorbing columns 1 and 2, 9 is a treatment gas pipe for introducing gas to be treated into the inlet pipe 7, 10 is a treated gas discharge pipe for discharging the treated gas from said outlet pipe 8, and 3a to 6a each are a shut-off valve inserted in said pipes 3 to 6.

In such a conventional exhaust gas treatment apparatus, the shut-off valves 3a and 4a are opened and the shut-off valves 5a and 5b are closed, when the gas adsorbing column 1 is used. When the adsorbing action of the gas adsorbing column 1 is finished (broken out) and an indicator (not shown) inserted in the upper part of the gas adsorbing column 1 detects untreated gas, shut-off valves 5a and 6a are opened and the shutoff valves 4a and 3a are closed to use the other gas adsorbing column 2. The gas adsorbing column 1 is exchanged for a new one while the gas adsorbing column 2 is being used.

In the conventional exhaust gas treatment apparatus described above, however, untreated gas which exists in the adsorbing column 1 and the outlet pipe 4, may be discharged (passed) to the outside by way of the discharge pipe 10, for instance when one of the gas adsorbing columns 1 is exchanged because of its break through.

Thus, a need exists for an exhaust gas treatment apparatus which prevents untreated gas from being discharged to the outside.

SUMMARY OF THE INVENTION

Accordingly, it is an object of the present invention to provide an exhaust gas treatment apparatus which prevents untreated gas from being discharged to the outside.

The above objects and others which will become apparent in view of the following are provided by an exhaust gas treatment apparatus, which entails first and second gas adsorbing columns each having inlet and outlet pipes; and switch-over pipes connecting said first and second gas adsorbing columns being alternatively arranged parallel to or in series with each other, said pipes having valves arranged therein.

BRIEF DESCRIPTION OF THE DRAWINGS

FIG. 5 is an illustrative view of a conventional exhaust gas treatment apparatus.

DESCRIPTION OF THE PREFERRED EMBODIMENTS

In accordance with the present invention, an exhaust gas treatment apparatus is provided, which entails a first and second gas adsorbing column; and pipes connecting the first and second gas adsorbing columns being alternatively arranged in parallel to or in series with each other, the pipes having valves arranged therein.

Figure 1:
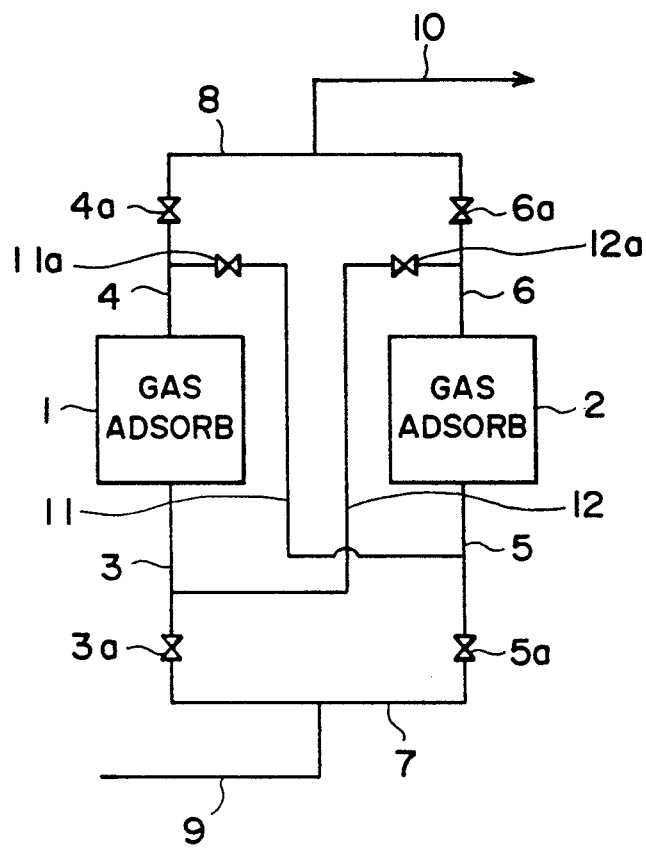
FIG. 1 is an illustrative view of the exhaust gas treatment apparatus according to the present invention.

According to the present invention, such a further countermeasure as described herein below is made in the conventional gas treatment apparatus shown in FIG. 5. Namely, the outlet pipes 4 and 6 of the first and second gas adsorbing columns 1 and 2 are connected with the inlet pipes 5 and 3 of the second and first gas adsorbing columns 2 and 1 by way of switch-over pipes 11 and 12, respectively, and a shut-off valve 11a, 12a is arranged in each of the switch-over pipes 11 and 12, as shown in FIG. 1.

Figure 2:
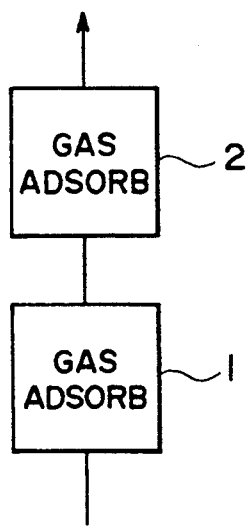
FIG. 2 is an illustrative view of the state of the gas adsorbing columns connected in the present invention.

The exhaust gas treatment apparatus according to the present invention is composed as mentioned above, and when in use, accordingly, shut-off valves 3a, 11a and 6a are opened and shut-off valves 4a, 5a and 12a are closed, and as a result, the first and second gas adsorbing columns 1 and 2 become arranged in series as shown in FIG. 2. In such an arrangement, the first gas adsorbing column 1 on the side of a treatment gas pipe 9 is first broken through. When an indicator inserted in the upper part of the first gas adsorbing column 1 detects that arrangement, shut-off valves 5a and 6a are opened and shut-off valves 3a and 11a are closed, with shut-off valves 4a and 12a being left closed. As a result, the first and second gas adsorbing columns become arranged in parallel as shown in FIG. 5. In such an arrangement, the first gas adsorbing column 1 is exchanged for a new one, and then shut-off valve 6a is closed with shut-off valves 3a and 11a being left closed, and shut-off valves 4a and 12a are opened with shut-off valve 5a being left opened. As a result, the first and second gas adsorbing columns 1 and 2 are caused to be in series as shown in FIG. 3, and the new first gas adsorbing column 1 become arranged being downstream of the second gas adsorbing column 2.

Thus, the second gas adsorbing column 2 is thereafter broken through, and when an indicator inserted in the upper part of the second gas adsorbing column 2 detects that arrangement, the shut-off valves are operated to be opened or closed, respectively, thereby providing the parallel arrangement of FIG. 5. After the second gas adsorbing column 2 is exchanged for a new one, the series arrangement of FIG. 2 is again provided.

Figure 4:
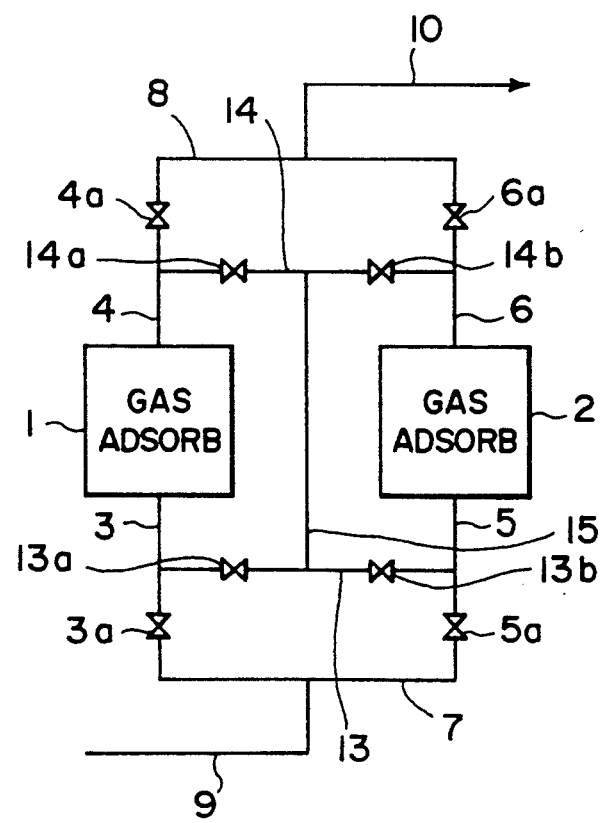
FIG. 4 is an illustrative view of the exhaust gas treatment apparatus in the other embodiment according to the present apparatus.

FIG. 4 shows another embodiment of the present invention. In this embodiment, another countermeasure mentioned below is made in the conventional exhaust gas treatment apparatus shown in FIG. 5. Namely, the inlet pipes 3 and 5 of the first and second gas adsorbing columns 1 and 2 and the outlet pipes 4 and 6 thereof are connected by a switch-over pipe 13, 14, respectively, and two shut-off valves 13a and 13b, 14a and 14b are inserted in each of the switch-over pipes 13 and 14, and the pipe 13 between the shut-off valves 13a and 13b and the pipe 14 between the shut-off valves 14a and 14b are connected by a common pipe 15.

Figure 3:
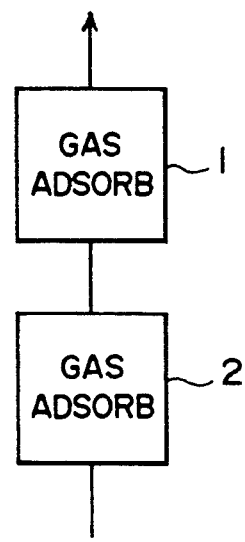
FIG. 3 is an illustrative view of the state of the gas adsorbing columns connected in the present invention.

When use of the apparatus of this embodiment commences, shut-off valves 3a, 14a, 13b and 6a are opened and shut-off valves 4a, 5a, 13a and 14b are closed, thereby providing the series arrangement shown in FIG. 2 or shut-off valves 5a, 14b, 13a and 4a are opened and the shut-off valves 3a, 6a, 14a and 13b are closed, thereby providing the series state shown in FIG. 3. Thus, it can be operated as in the above-mentioned first embodiment. According to the second embodiment, the pipe 15 can be common, although the number of shutoff valves is larger by two, as compared with the first embodiment.

The exhaust gas treatment apparatus according to the present application is quite advantageous, because even if untreated gas remains in the outlet pipe 4 or 6 and in the gas adsorbing column 1 or 2 due to the breakthrough of the gas adsorbing column 1 or 2, this gas is discharged to the outside by way of the other gas adsorbing column. As a result, the passage of untreated gas is avoided.

Having described the present invention, it will be readily apparent to one of ordinary skill in the art that many changes and modifications may be made to the above-described embodiments without departing from the spirit and the scope of the present invention.

We claim:

1. An exhaust gas treatment apparatus, which consists of first and second gas adsorbing columns each having inlet and outlet pipes; and switch-over pipes connecting the first and second gas adsorbing columns, said adsorbing columns being arranged either in parallel to or in series with each other, the switch-over pipes having valves arranged therein.

2. The exhaust gas treatment apparatus of claim 1, wherein the outlet pipes of the first and second gas adsorbing columns are connected with the inlet pipes of the second and first gas adsorbing columns by said switch-over pipes.

3. The exhaust gas treatment apparatus of claim 1, wherein said switch-over pipes contain at lease one shut-off valve therein.

4. A method of subjecting exhaust gas to gas adsorption in a gas adsorption apparatus whereby release of untreated gas is prevented when exchanging gas adsorbing columns, which comprises treating said exhaust gas in an apparatus which consists of having first and second adsorbing columns each having inlet and outlet pipes; and switch-over pipes connecting the first and second gas adsorbing columns, said adsorbing columns being arranged either in parallel to or in series with each other, the switch-over pipes having valves arranged therein.

5. The method of claim 4, wherein the outlet pipes of the first and second gas adsorbing columns are connected with the inlet pipes of the second and first gas adsorbing columns by said switch-over pipes.

* * * * *